United States Patent
Grodzki et al.

(10) Patent No.: US 12,514,510 B2
(45) Date of Patent: Jan. 6, 2026

(54) MOTION CORRECTION AND MOTION REDUCTION IN A FACIAL REGION DURING DEDICATED MAGNETIC RESONANCE IMAGING

(71) Applicant: Siemens Healthineers AG, Forchheim (DE)

(72) Inventors: David Grodzki, Erlangen (DE); Mario Zeller, Erlangen (DE); Carmel Hayes, Munich (DE); René Kartmann, Nuremberg (DE)

(73) Assignee: Siemens Healthineers AG, Forchheim (DE)

(*) Notice: Subject to any disclaimer, the term of this patent is extended or adjusted under 35 U.S.C. 154(b) by 0 days.

(21) Appl. No.: 18/372,297

(22) Filed: Sep. 25, 2023

(65) Prior Publication Data

US 2024/0008820 A1 Jan. 11, 2024

Related U.S. Application Data

(62) Division of application No. 17/101,591, filed on Nov. 23, 2020, now abandoned.

(Continued)

(51) Int. Cl.
*A61B 5/00* (2006.01)
*A61B 5/055* (2006.01)
(Continued)

(52) U.S. Cl.
CPC ............ *A61B 5/7214* (2013.01); *A61B 5/055* (2013.01); *A61B 5/4547* (2013.01); *A61B 5/70* (2013.01);
(Continued)

(58) Field of Classification Search
CPC ... A61B 5/7289; A61B 5/7292; A61B 5/4547; A61B 2090/363; A61B 90/16;
(Continued)

(56) References Cited

U.S. PATENT DOCUMENTS

| 5,549,616 A | 8/1996 | Schulte et al. |
| 2002/0123706 A1* | 9/2002 | Browd .................. A61B 90/14 602/13 |

(Continued)

OTHER PUBLICATIONS

Sengupta et al., "Prospective Real-Time Head Motion Correction Using Inductively Coupled Wireless NM R Probes," (Nov. 18, 2013), Magnetic Resonance in Medicine 72:971-985 (2014). (Year: 2013).

*Primary Examiner* — Keith M Raymond
*Assistant Examiner* — Ashish S Jasani
(74) *Attorney, Agent, or Firm* — Banner & Witcoff, Ltd.

(57) ABSTRACT

In a method and system for reducing motion artifacts in magnetic resonance image data acquired from a facial region of a patient, the patient is positioned in an imaging region of a magnetic resonance imaging device configured to perform a magnetic resonance measurement of the facial region of the patient, the magnetic resonance measurement is performed to acquire magnetic resonance image data of the facial region of the patient, and a motion correction technique is employed exploiting an accessibility to the facial region of the patient during the magnetic resonance measurement. The motion correction technique advantageously reduces an influence of a patient motion on the magnetic resonance image data.

18 Claims, 5 Drawing Sheets

Related U.S. Application Data

(60) Provisional application No. 62/941,163, filed on Nov. 27, 2019.

(51) Int. Cl.
| | |
|---|---|
| *A61B 90/00* | (2016.01) |
| *A61C 5/00* | (2017.01) |
| *G01R 33/28* | (2006.01) |
| *G01R 33/30* | (2006.01) |
| *G01R 33/54* | (2006.01) |
| *G01R 33/56* | (2006.01) |
| *G01R 33/565* | (2006.01) |

(52) U.S. Cl.
CPC ............ *A61B 5/702* (2013.01); *A61B 5/7289* (2013.01); *A61B 5/7292* (2013.01); *A61C 5/007* (2013.01); *G01R 33/283* (2013.01); *G01R 33/30* (2013.01); *G01R 33/543* (2013.01); *G01R 33/5608* (2013.01); *G01R 33/56509* (2013.01); *A61B 2090/3912* (2016.02); *A61B 2090/3954* (2016.02); *A61B 2576/02* (2013.01)

(58) Field of Classification Search
CPC ..... A61B 5/7207; A61B 5/1127; A61B 5/055; A61B 5/6814; G01R 33/34
See application file for complete search history.

(56) References Cited

U.S. PATENT DOCUMENTS

| | | |
|---|---|---|
| 2005/0137475 A1 | 6/2005 | Dold |
| 2006/0058619 A1* | 3/2006 | DeYoe .................... G06T 11/00 600/407 |
| 2006/0281991 A1 | 12/2006 | Fitzpatrick et al. |
| 2016/0035108 A1 | 2/2016 | Yu et al. |
| 2017/0128025 A1* | 5/2017 | Chen ..................... A61B 5/0263 |
| 2021/0007696 A1* | 1/2021 | Ziarati ................... A61B 6/032 |
| 2021/0169437 A1* | 6/2021 | Boll ...................... A61B 6/5235 |
| 2022/0413080 A1* | 12/2022 | Beck ................. G01R 33/4826 |

* cited by examiner

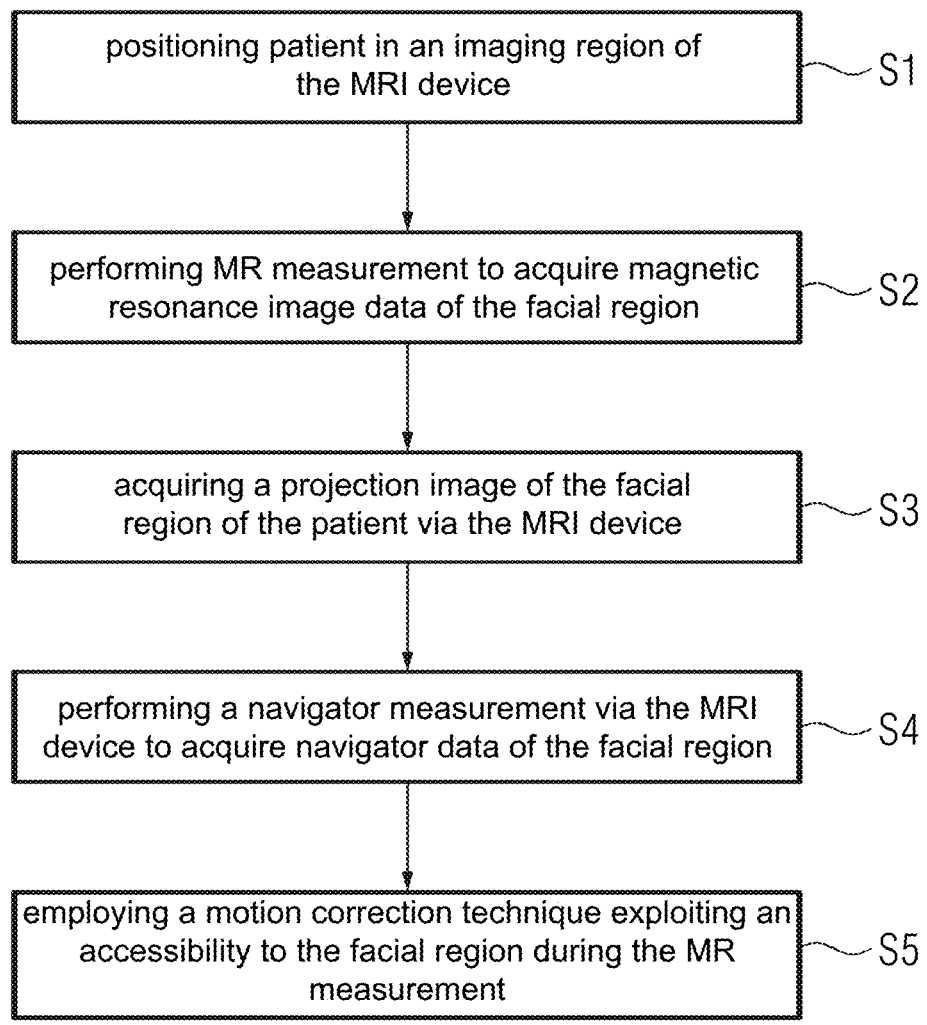

MOTION CORRECTION AND MOTION REDUCTION IN A FACIAL REGION DURING DEDICATED MAGNETIC RESONANCE IMAGING

CROSS REFERENCE TO RELATED APPLICATIONS

This patent application is a divisional patent application of U.S. patent application Ser. No. 17/101,591, filed Nov. 23, 2020, which claims priority to, and the benefit of, U.S. Provisional Patent Application No. 62/941,163, filed Nov. 27, 2019, each of which is incorporated herein by reference in its entirety.

BACKGROUND

Field

The disclosure relates to a method for reducing motion artifacts in magnetic resonance image data acquired from a facial region of a patient, a magnetic resonance imaging system, comprising a magnetic resonance imaging device and a processor, wherein the processor is configured to coordinate and execute an inventive method by means of the magnetic resonance imaging device.

Related Art

The facial region accommodates a number of important sensory organs and bodily functions which are important, for example, for communication, ingestion and perception. The facial region of the body may be affected by a multitude of different diseases, which may drastically affect the way of living of an individual. Typically, diseases of different parts of the facial region are diagnosed using different diagnostic techniques. For example, diseases of the teeth and the periodontium, such as caries or periodontitis, are typically diagnosed with X-ray-based imaging methods. For this purpose, conventional or digital X-ray projection methods, and recently also three-dimensional (3D) X-ray methods, are used. An example of a three-dimensional X-ray method is digital volume tomography, which can be used for imaging of the teeth and the viscerocranium.

A major disadvantage of X-ray-based imaging methods is constituted by the need for an application of ionizing radiation for imaging. Magnetic resonance tomography is an imaging method that avoids using ionizing radiation. Furthermore, magnetic resonance tomography typically provides an enhanced soft tissue contrast in comparison to X-ray-based imaging methods and natively supports three-dimensional imaging of an examination object. Thus, magnetic resonance tomography represents a potential alternative to known X-ray methods for imaging teeth and/or jaws of the examination object as well as diagnosing dental diseases. However, other regions of the head of the patient may also benefit from magnetic resonance tomography. For example, imaging of the eyes is currently performed with dedicated cameras, providing essentially a front-view image of the eye. Magnetic resonance tomography may facilitate the diagnosis of eye diseases by providing three-dimensional information on the orbit and the eye cavity.

Magnetic resonance tomography represents a prominent imaging method for acquiring images of an interior of the examination object. In order to carry out a magnetic resonance measurement, the examination object is positioned in a strong and homogeneous, static magnetic field (B0 field) of a magnetic resonance device. The static magnetic field may comprise magnetic field strengths of 0.2 Tesla to 7 Tesla in order to align nuclear spins within the examination object with the static magnetic field. For triggering so-called nuclear spin resonances, radiofrequency excitation pulses are emitted into the examination subject. Each radiofrequency excitation pulse causes a magnetization of nuclear spins within the examination object to deviate from the static magnetic field by an amount which is known as the flip angle. A radiofrequency excitation pulse may be provided via a high frequency magnetic field alternating with a frequency which corresponds to the Larmor frequency at the respective static magnetic field strength. Excited nuclear spins may exhibit a rotating and decaying magnetization (magnetic resonance signal), which can be detected using dedicated radiofrequency antennas. For spatial encoding of measured data, rapidly switched magnetic gradient fields are superimposed on the static magnetic field.

The received nuclear magnetic resonances are typically digitized and stored as complex values in a k-space matrix. This k-space matrix provides a basis for a reconstruction of magnetic resonance images and for determining spectroscopic data. A magnetic resonance image is typically reconstructed by means of a multi-dimensional Fourier transformation of the k-space matrix.

In avoiding ionizing radiation, magnetic resonance tomography is particularly suitable for continuous or repetitious diagnostic monitoring of dental diseases and/or tooth development, for example within the framework of a longitudinal imaging study. Longitudinal imaging studies may comprise carrying out a plurality of imaging examinations in order to determine a progression of a disease or a success of a therapeutic treatment over an elongated period of time. A disadvantage usually associated with magnetic resonance tomography is the amount of time required for performing the magnetic resonance measurement in comparison to other imaging methods. This poses a challenge for acquiring magnetic resonance image data of the patient, particularly the face region of the patient, as this region is associated with frequent, often unintentional movement such as blinking or swallowing. Patient motion may cause image artifacts like diffuse image noise or ghosting effects, thus compromising a quality of acquired magnetic resonance images as well as the diagnosis based thereon.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 5 is a flowchart of a method for reducing motion artifacts according to an exemplary embodiment of the disclosure.

Figure 1:
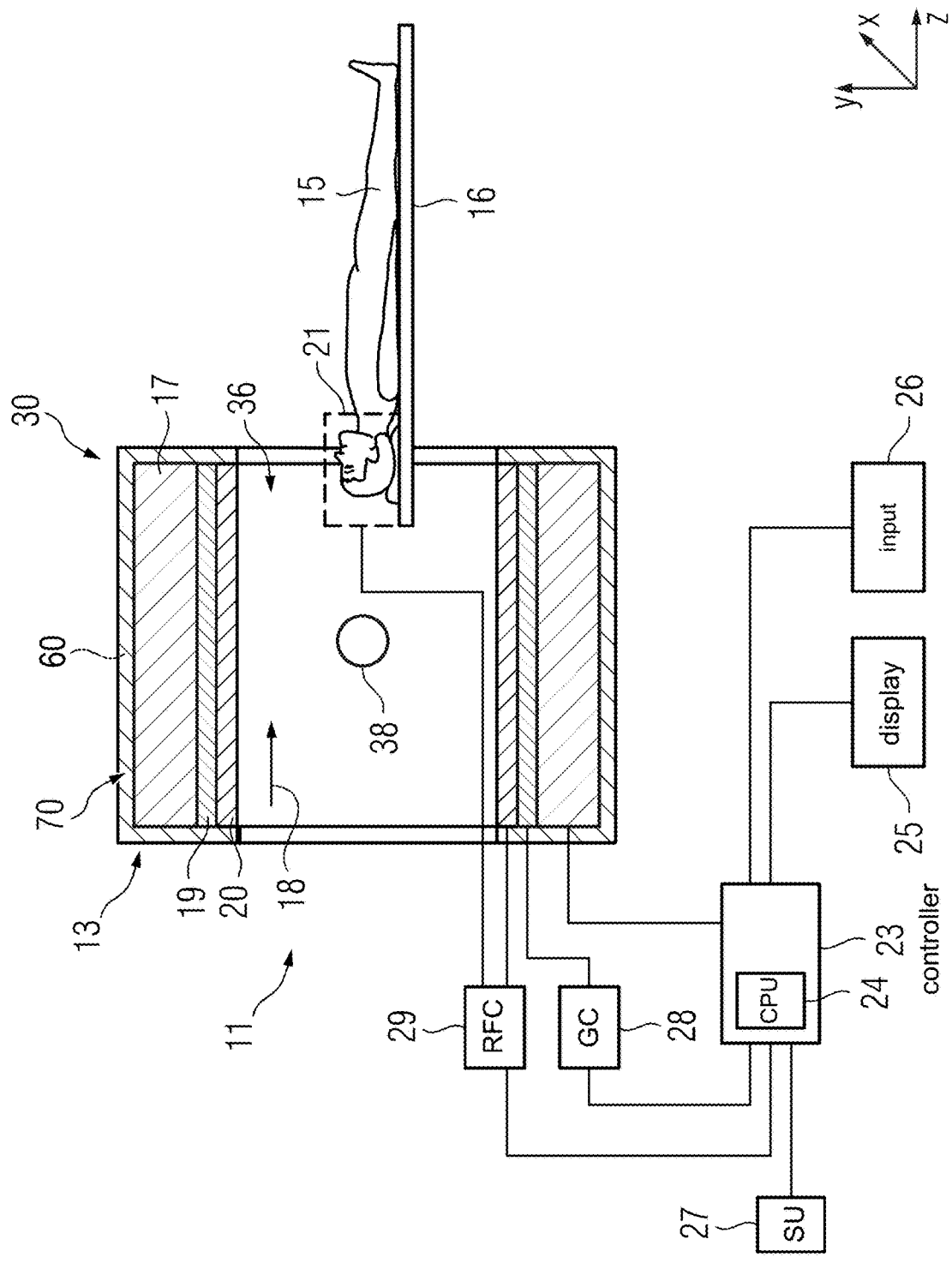
FIG. 1 is a schematic representation of a magnetic resonance imaging system according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is therefore an object of the disclosure to reduce an influence of patient motion on magnetic resonance image data.

This object is achieved by a method, a magnetic resonance imaging system and a computer program product according to the disclosure.

The inventive method reduces motion artifacts in magnetic resonance image data acquired from a facial region of a patient. A motion artifact may represent any blurring, streaking, smearing and/or shading as well as diffuse image noise and/or ghosting in magnetic resonance images caused by a movement of the patient during a magnetic resonance measurement. The movement may comprise voluntary and/or involuntary movement. Examples for common patient movements are, amongst others, tilting or turning a head, blinking, swallowing, rolling an eye, moving a tongue, moving a cheek, moving a lip, moving a jaw, but also respiratory motion and so forth.

In one step of the inventive method, the patient is positioned in an imaging region of a magnetic resonance imaging device configured to perform a magnetic resonance measurement of the facial region of the patient. An imaging region may represent a volume wherein the patient is positioned in order to perform a magnetic resonance measurement of the patient. The imaging region is at least partially encompassed by a magnetic field generator of the magnetic resonance imaging device. For example, the imaging region may be confined by the magnetic field generator in at least one spatial direction, at least two spatial directions or at least three spatial directions. It is also conceivable, that the imaging region is encompassed by the magnetic field generator in a circumferential direction. The magnetic field generator may be configured to provide a homogenous, static magnetic field (B0-field), a magnetic gradient field and/or a high frequency magnetic field (B1-field) inside the imaging region of the magnetic resonance imaging device. In an exemplary embodiment, the magnetic field generator is configured to provide an imaging volume within the imaging region, the imaging volume being characterized by a particularly homogenous magnetic field or an approximately linear magnetic gradient field. The imaging volume may be an isocenter of the magnetic resonance imaging device. In one embodiment, a dimension of the imaging volume may correspond to a dimension of the diagnostically relevant area. It is conceivable, that the magnetic resonance imaging device encloses at least a part of the head of the patient, when the patient is positioned in the imaging region. Positioning the head of the patient in the imaging region may comprise locking the head of the patient in a predefined relative position to the magnetic resonance imaging device. For example, the magnetic resonance imaging device may comprise adjustable mechanical elements and/or fasteners configured to fix the head of the patient in a predefined position, thus preventing the head from moving during the magnetic resonance measurement.

In a further step of the inventive method, the magnetic resonance measurement is performed to acquire magnetic resonance image data of the facial region of the patient. A magnetic resonance measurement may comprise performing an imaging sequence which may be characterized by a plurality of imaging parameters. The plurality of imaging parameters may determine, for example, a size and/or position of the imaging volume, a property and/or temporal succession of the magnetic gradient field and/or the high frequency magnetic field, as well as a time for readout of magnetic resonance signals from the imaging volume. Examples for commonly used imaging parameters are a repetition time, an echo time, a field of view, a spatial resolution and the like. In an exemplary embodiment, the imaging sequence is configured to provide a high signal intensity or a bright contrast of the diagnostically relevant area of the patient. For example, the imaging sequence may comprise a short echo time in order to account for a short T2-relaxation time associated with dentine or enamel of a tooth of the patient. A short echo time may be lower than 150 µs or lower than 70 µs. Examples of imaging sequences with a short echo time are FLASH (fast low-angle shot) sequences and UTE (ultra-short echo time) sequences. However, it is also conceivable to image dentine or enamel of teeth with an imaging sequence comprising a longer echo time, such as a TSE (turbo spin echo) sequence. In using longer echo times, teeth may be characterized via a particularly low signal intensity or a dark contrast. Thus, the dentine or enamel of teeth may easily be differentiated from surrounding tissue comprising a bright contrast. Of course, the imaging sequences presented are to be understood as examples and other imaging sequences may be employed to acquire magnetic resonance imaging signals from a diagnostically relevant region of the face of the patient. In particular, imaging sequences may be configured to provide an appropriate contrast of specific parts of the facial region. The facial region may comprise one or more of the following body parts of the patient: one eye or both eyes, an eyeball, an eye cavity, a retina, a jaw region, a jawbone, a gingiva, an enamel, a dental arch, a dentine, a dental root of the patient. Posterior or inaccessible parts of the head of the patient, such as a brain, a back of the head or a part of a spinal cord, are not considered to be parts of the facial region of the patient. Magnetic resonance imaging of such posterior or inaccessible parts of the head are therefore explicitly excluded from a scope of the proposed inventive method.

In one step of the inventive method, a motion correction technique exploiting an accessibility to the facial region of the patient during the magnetic resonance measurement is employed, wherein the motion correction technique reduces an influence of a patient motion on the magnetic resonance image data. A motion correction technique may comprise techniques that mechanically limit or restrict the motion of the patient. For example, the magnetic resonance imaging device may comprise a mechanical means, such as a fastener, which is configured to arrest the head of the patient in a predefined position in order to limit a movement of the patient's head. However, the mechanical means may also represent a separate component or device, which may be oriented or aligned in a relative position to the magnetic resonance device when performing a magnetic resonance measurement of the facial region of the patient. In one example, the mechanical means may comprise a separate chair or a stand with a head cover configured to receive at least the head of the patient and to fix the head of the patient in a predefined position in order to prevent movement during the magnetic resonance measurement.

However, the motion correction technique may also comprise techniques for determining and/or quantifying a motion of the patient during the magnetic resonance measurement. In particular, the motion correction may comprise techniques for correcting acquired magnetic resonance image data in dependence of the determined and/or quantified patient motion. This concept is referred to as retrospective correction of the magnetic resonance image data. It is also conceivable, that the motion correction technique comprises adjusting imaging parameters of an imaging sequence in real-time during the magnetic resonance measurement in order to prospectively correct the acquired magnetic resonance image data. The patient motion may be determined by employing a sensor, such as a motion sensor and/or an optical sensor, which is configured to acquire information on a movement of the patient during the magnetic resonance measurement. The motion correction technique may further comprise using algorithms, particularly image processing algorithms, configured to compensate for patient movement by processing or manipulating the acquired magnetic resonance image data or the reconstructed magnetic resonance images in dependence of information acquired via the sensor.

The motion correction technique exploits an accessibility to the facial region of the patient during the magnetic resonance measurement. The accessibility to the facial region of the patient may be provided via a physical access, such as an entry, a clearance and/or an unobstructed view, which may be used to apply a mechanical sensor and/or acquire an optical image with an optical sensor configured for detecting a motion of the patient. In particular, the accessibility may comprise a clearance for a mechanical element, such as a fixation element and/or a mouth guard configured for positioning within an intraoral region of the patient. However, the accessibility to the facial region may further relate to the fact, that the magnetic resonance imaging device is a dedicated scanner, configured to acquire magnetic resonance image data from a specific facial region of the patient.

By reducing an influence of a patient motion on the magnetic resonance image data, an occurrence of motion artifacts in magnetic resonance images can advantageously be reduced or avoided. Thus, a quality of magnetic resonance images can be increased and a risk for misdiagnosis of magnetic resonance images and/or a need for repetition of the magnetic resonance measurement can advantageously be decreased.

In one embodiment of the inventive method, the facial region comprises a teeth region and/or jaw region of the patient, wherein the motion correction technique comprises positioning a mouth guard in an intraoral region of the patient to suppress movement of the teeth region and/or the jaw region of the patient while performing the magnetic resonance measurement. A mouth guard may be shaped in such a way, that the mouth guard may be positioned between an upper dental arch and a lower dental arch inside an oral cavity of the patient. For example, the shape of the mouth guard may comprise a U-shape approximating the shape of a lower dental arch and/or an upper dental arch of the patient. It is conceivable, that the shape of the mouth guard is designed to fit a target group of patients. However, the mouth guard may also comprise adjustable elements in order to adjust the shape or a dimension of the mouth guard to the mouth cavity or a dental arch of an individual patient. For example, the mouth guard may be a gum shield, a removable brace or any other element shaped in such a way, that it can be positioned in the oral cavity of the patient and limit movement of at least one jaw. In an exemplary embodiment, the mouth guard consists of a biocompatible material. A biocompatible material may be configured to avoid undesirable side effects on the patient. For example, a biocompatible material may comprise a high cell and blood compatibility and may be histopathologically harmless. Possible examples of biocompatible materials are plastics such as silicones, polyethers, polyamides, polycarbonates, but also polymers of various natural substances such as proteins, saccharides, peptides and the like. Ceramics, such as aluminum oxide, gypsum or hydroxyapatite are further examples of suitable biocompatible materials. The mouth guard may be configured to provide a spacing between the upper dental arch and the lower dental arch of the patient, when positioned in the oral cavity of the patient. Thus, the upper dental arch and the lower dental arch may be held apart, preventing a relative motion of the two dental arches. However, the patient may also be instructed or required to bite upon the mouth guard during magnetic resonance measurement.

In providing a mouth guard to prevent a relative motion of the lower dental arch and the upper dental arch of the patient during the magnetic resonance measurement, motion artifacts due to movement of the jaws can favorably be reduced or avoided.

According to one embodiment of the inventive method, the mouth guard comprises a suction pipe, wherein the motion correction technique comprises saliva being drained from the intraoral region of the patient via the suction pipe while the magnetic resonance measurement is performed in order to reduce a need for swallowing. The suction pipe may represent a channel or a cavity in the mouth guard. The channel or cavity may comprise at least one opening in the oral cavity of the patient and at least one opening connected to a vacuum system. For example, the suction pipe may be connected to a pump or a compressor configured to provide a vacuum for draining saliva from the oral cavity of the patient. The suction pipe may also be embedded within the mouth guard, protruding from a surface of the mouth guard in such a way, that it may drain the *salvia* from underneath a tongue of the patient. For this purpose, in an exemplary embodiment, the suction pipe consists of a flexible, biocompatible material. In a further embodiment, the suction pipe may also be used to fill the patient's mouth with a fluid configured to enhance and/or change a contrast in a magnetic resonance image. For example, the suction pipe may be configured to provide an inflow of water covering the teeth of the patient in order to provide a predetermined contrast with respect to the teeth of the patient.

In providing a suction pipe integrated into the mouth guard, saliva can be drained from the oral cavity of the patient. Thus, a patient's urge for swallowing can advantageously be reduced, as well as an associated swallowing motion causing artifacts in the magnetic resonance images.

In a further embodiment of the inventive method, the magnetic resonance measurement comprises acquiring separate magnetic resonance image data from a lower jaw and an upper jaw of the teeth region and/or jaw region, wherein the motion correction technique comprises a prospective and/or retrospective correction of the magnetic resonance image data in dependence of a rigid model of the lower jaw and the upper jaw of the patient. The rigid model of the lower jaw and the upper jaw of the patient may be derived, for instance, from magnetic resonance images of the patient (e.g. via segmentation) and/or from a database storing models, which may be adjusted to an individual patient via parameterization. It is conceivable, that the lower jaw and the upper jaw of the patient may be treated as rigid bodies when correcting the acquired magnetic resonance image data for patient movement, thus allowing for an increase of an accuracy of the motion correction (e.g. up to a sub μm accuracy). For this purpose, a separate correction of the acquired data may be performed, depending on a time of acquisition, a respective motion state and/or relative position of the lower jaw and the upper jaw of the patient. The individual k-space-lines may be transferred to an image space before correction. For example, based on the rigid model, a translational motion of the lower jaw and/or the upper jaw may be corrected by applying a phase change to the acquired magnetic resonance image data. In order to compensate for rotational movement of the head of the patient 15, non-Cartesian reconstruction methods may be applied. In an exemplary embodiment, an imaging parameter of the magnetic resonance measurement is adjusted when acquiring magnetic resonance image data of the upper jaw or the lower jaw in dependence of the rigid model. For this purpose, a movement of a patient's jaw may be determined via correlation of a position of the rigid model with a position of the patient's jaw. In order to prospectively reduce an influence of the patient motion, an encoding gradient of the imaging sequence may be rotated in accordance with a rotational movement of a patient's jaw, whereas a translational movement may be accounted for by changing a frequency and/or phase of the radiofrequency excitation pulse. Depending on the diagnostically relevant region, the magnetic resonance measurement may be optimized to acquire magnetic resonance signals from the upper jaw or the lower jaw, if only one jaw is of interest. It is also conceivable, however, that the magnetic resonance measurement is optimized to acquire magnetic resonance image data from parts of the upper jaw and/or the lower jaw.

By using a rigid model of the upper jaw and/or the lower jaw of the patient, correcting the magnetic resonance image data for motion of the patient can be carried out in a robust and reproducible fashion.

In an exemplary embodiment of the inventive method, the motion correction technique comprises positioning a mechanical element in contact with the facial region of the patient, wherein the mechanical element comprises a motion sensor, wherein the motion correction technique comprises determining a displacement of the mechanical element due to motion of the patient while performing the magnetic resonance measurement and wherein the motion correction technique comprises a prospective and/or retrospective correction of the magnetic resonance image data in dependence of the displacement of the mechanical element. The motion sensor is configured to determine a displacement of the mechanical element in order to quantify a movement of the patient. For this purpose, the motion sensor may comprise a gyroscope, a pressure gauge, an accelerometer and the like. Possible examples of mechanical elements are a chinrest, a headrest, a mouth guard or any fixating and/or supporting structure in contact with the facial region of the patient, particularly the jaw region of the patient. In accordance with the example of a mouth guard, the motion sensor and/or the mechanical element may be positioned within the oral cavity of the patient during the magnetic resonance measurement.

The mechanical element may consist of a non-rigid material or comprise non-rigid elements. For example, the mechanical element may comprise elastic elements, such as a spring element, an expansion member, a flexible element and the like, which may be deformed as a consequence of movement of the patient. Thus, a movement of the patient may be determined in dependence of a deformation of the elastic element via a pressure gauge and/or a strain gauge.

In an exemplary embodiment, the mechanical element comprises a chinrest or a headrest. In one example, the mechanical element may be a simple holder, such as a supportive chinrest. In another example, the mechanical element comprises a more sophisticated structure, wherein the head of the patient may be positioned or be embedded. The mechanical element may at least partially encompass at least a part of the patient's head. It is also conceivable, that the mechanical element encompasses the patient's head in a circumferential direction. A motion sensor integrated into the mechanical element may be configured to determine a motion of the head or the facial region and provide feedback to the magnetic resonance imaging device in real-time. For example, the determined motion may be represented by motion data comprising time-related, positional information on the head of the patient and/or the facial region of the patient. A function of the motion sensor may be similar to a function of a motion sensor of a gimbal in a drone or a hand-held camera. However, the motion correction technique may further comprise adjusting an imaging parameter, such as a property of a radiofrequency excitation pulse and/or an orientation of an encoding gradient, in dependence of the motion data in real-time during the magnetic resonance measurement. It is also conceivable, that an information on the determined motion is fed back to an image reconstruction algorithm in order to correct the magnetic resonance image data for motion of the patient retrospectively.

A motion sensor integrated into a mechanical element of the magnetic resonance imaging device favorably allows for a particularly cost-efficient implementation of a motion correction technique.

According to one embodiment of the inventive method, the motion correction technique comprises employing an optical sensor to acquire optical image data of the facial region of the patient while performing the magnetic resonance measurement, wherein the motion correction technique comprises a prospective and/or retrospective correction of the magnetic resonance image data in dependence of the optical image data. The optical sensor may comprise a camera, such as a two-dimensional (2D) camera, an infrared camera or a 3D camera, which is configured to acquire optical image data of the patient's head and/or face during the magnetic resonance measurement. However, the camera may also be used for preparation and/or positioning of the patient before the magnetic resonance measurement. The camera may comprise a processor configured to process the acquired optical image data and determine motion data of the patient's head and/or face. For example, motion data may characterize and/or quantify a movement and/or a current orientation of the patient's head and/or the face of the patient. It is also conceivable, that the camera is configured to transmit the acquired optical image data and/or motion data to a separate processor, e.g. a processor of the magnetic resonance imaging device. Thus, the magnetic resonance imaging device may be able to quantify a movement of the patient during the magnetic resonance measurement and/or during preparation for the magnetic resonance measurement. In an exemplary embodiment, the processor of the magnetic resonance imaging device is configured to determine motion data related to the patient's head and/or face in dependence of optical image data received from the optical sensor.

It is conceivable, that one or more cameras are used in order to acquire optical image data and/or motion data of the patient. The one or more cameras may be positioned in an examination space comprising the magnetic resonance imaging device, in front of the patient's face and/or within the oral cavity of the patient. In an exemplary embodiment, the optical sensor may be configured to detect facial landmarks of the patient. For example, facial landmarks may be used to determine a tilting of the head, a swallowing motion, a blinking motion, a jaw movement, an eye movement or any other movement of the head and/or face during a predefined time period. During this time period, the magnetic resonance measurement may be suspended in order to avoid image artifacts when reconstructing a magnetic resonance image. However, it is also conceivable, that the acquired magnetic resonance image data of this time period is disregarded when reconstructing a magnetic resonance image. Analogous to an embodiment described above, the motion data derived from the optical image data may be used to adjust an imaging parameter during the magnetic resonance measurement and/or to correct the acquired magnetic resonance image data for motion of the patient.

In one embodiment, the use of an optical sensor is combined with an artificial intelligence-based training. For example, in a learning phase, a movement of the facial landmarks is correlated with an actual movement of the jaws. For this purpose, a motion sensor, e.g. integrated into a mouth guard or a brace, may be applied in order to determine a relative position of the upper jaw and the lower jaw. Thus, the movement of facial landmarks may be correlated with an expected movement of the jaws. In an applying phase, the expected movement of the jaws may be correlated with a movement of facial landmarks determined via the optical sensor. This is particularly advantageous, as some motion sensors may not be compatible with magnetic fields and cannot easily be positioned in proximity to the imaging volume of the magnetic resonance imaging device.

In using an optical sensor, the movement of the patient can be determined from a distance. Thus, a positioning of a sensor in direct proximity to the magnetic field of the magnetic resonance imaging device can advantageously be avoided.

According to one embodiment of the inventive method, the facial region of the patient is an eye region of the patient and optical image data is acquired from an eye of the patient. It is conceivable, that the magnetic resonance imaging device is a dedicated eye scanner configured to acquire magnetic resonance signals from the eye region of the patient. In an exemplary embodiment, the eye scanner comprises one or more optical sensors, for example one or more cameras, configured to track a motion of at least one eye of the patient. The one or more cameras may be configured in such a way, that a field of view provided by the one or more cameras is focused on the at least one eye of the patient.

In one embodiment, the magnetic resonance imaging device comprises a processor configured to process optical image data provided by an optical sensor. The processor may comprise a detection and/or tracking algorithm configured to track, for instance, a position and/or a motion of a pupil of the eye of the patient during the magnetic resonance measurement. As a relative position of the eyes and the head of the patient is constant, it may be sufficient to derive rotational coordinates only. In one embodiment, the patient's head may freely be moved within the imaging region of the magnetic resonance imaging device. In this case, a plurality of cameras may be used to track the total head motion of the patient. For example, the processor may be configured to separately process head related motion data and eye related motion data. The processor may further be configured to take into account the head related motion data and/or the eye related motion data when reconstructing a magnetic resonance image as described above. It is conceivable, that the detected motion is used to prospectively correct the magnetic resonance image data, i.e. by adjusting an imaging parameter, such as a field of view, a slice center and/or an excitation pulse frequency, for a next acquired k-space line. For example, a determined rotation of the head of the patient may be used to rotate an encoding gradient, whereas a determined translation may be used to adjust transmit and receive frequency and phase. However, the detected motion may also be used to retrospectively correct the magnetic resonance image data.

In a further embodiment, a camera is used for triggering a magnetic resonance measurement. For example, magnetic resonance image data may be acquired only when the patient focuses a target region and discarded at other times. A focus of the patient may be determined via one or more cameras directed at an eye of the patient.

Of course, the inventive methods may also be employed in a conventional magnetic resonance imaging device instead of a dedicated eye scanner. In this case, the cameras and/or optical sensors may be carried by a dedicated eye coil or a conventional head coil. It is also conceivable, that the camera tracking described above may be used for other ophthalmological examinations.

In providing a method for acquiring motion data of an eye of the patient, a diagnostic capability of magnetic resonance imaging can favorably be increased. Thus, a distribution of dedicated magnetic resonance imaging devices for specific body regions can be enhanced and patients can benefit from three-dimensional imaging techniques.

In a further embodiment, the inventive method comprises the step of acquiring a projection image of the facial region of the patient, wherein the motion correction technique comprises adjusting a projection direction in dependence of a detected motion of the facial region of the patient. Projection imaging may represent a magnetic resonance measurement without gradient encoding in one spatial direction. Thus, an essentially 2D projection image of a 3D imaging volume within the patient may be obtained. In an exemplary embodiment, projection imaging is employed for dental imaging. In order to reduce an influence of the patient's motion, the motion correction technique may comprise adjusting a projection direction according to a detected motion of the patient's teeth. For this purpose, a slice-following technique may be employed. The movement of the patient may be detecting via an optical sensor and/or a motion sensor as described above.

In comparison to X-ray based acquisition techniques for dental imaging, magnetic resonance imaging provides a unique advantage of being completely flexible with regard to the direction of acquired projections for a Radon transformation. If, for example, the patient tilts the head backwards during acquisition of image data, an X-ray projection imaging device may not allow for a movement according to the tilting of the patient's head. For magnetic resonance imaging, following a patient's movement can favorably be realized by choosing an imaging rotation matrix equal to the patient's matrix.

According to a further embodiment, the inventive method comprises the step of performing a navigator measurement of the facial region of the patient to acquire navigator data, wherein the motion correction technique comprises detecting a displacement of a characteristic feature in the navigator data and prospectively and/or retrospectively correcting the magnetic resonance image data in dependence of the displacement of the characteristic feature. When performing the navigator measurement, an essentially one-dimensional image area, such as a linear or pencil-like image area, may be selected. In an exemplary embodiment, the image area is oriented approximately perpendicular to an expected moving direction of the patient or a moving body part of the patient. It is conceivable, that the image area comprises regions with varying contrasts in order to permit an accurate detection of a movement of the patient. In an exemplary embodiment, the image area comprises a region with high T2(*) variations. An example for such a region is a border between a tooth and other tissue (e.g. soft tissue) within the oral cavity of the patient. A characteristic feature may represent a high signal intensity provided by a tooth within the image area when using an imaging sequence with a short echo time. However, a characteristic feature may also be represented by other anatomical structures, tissue or any other volume within the patient comprising a prominent or characteristic signal intensity. A displacement of the characteristic feature may be determined via a shift or relocation of an area with high signal intensity within a static image area of the navigator measurement. In analogy to an embodiment described above, the displacement of the characteristic feature may be used to adjust an imaging parameter during the magnetic resonance measurement and/or to correct the acquired magnetic resonance image data for motion of the patient.

By performing a navigator measurement in an image area comprising at least a part of a tooth, navigator data with a particularly high contrast differences may be obtained. Thus, a detection of movement can be facilitated and/or an accuracy of a detection of movement can favorably be increased.

In a further embodiment of the inventive method, the mouth guard comprises a magnetic resonance visible marker, wherein the motion correction technique comprises detecting the magnetic resonance visible marker during the magnetic resonance measurement and wherein the motion correction technique comprises a prospective and/or retrospective correction of the magnetic resonance image data in dependence of a displacement of the magnetic resonance visible marker due to motion of the patient. By providing a mouth guard with magnetic resonance visible markers, the magnetic resonance visible markers may be positioned in the oral cavity of the patient. For this purpose, in an exemplary embodiment, the magnetic resonance visible markers consist of a biocompatible material. For example, a magnetic resonance visible marker may be a capsule comprising Vitamin D, Vitamin E or cod liver oil. One or more capsules may be attached to a mouth guard or removable braces which may be positioned in the oral cavity of the patient before the magnetic resonance measurement.

In an exemplary embodiment, the magnetic resonance visible marker is configured to provide a high intensity magnetic resonance signal. Such a signal may be detected and used for determining a movement of the patient during the magnetic resonance measurement. For example, a displacement of the magnetic resonance visible marker due to motion of the patient may be determined via a shift or relocation of an area with high signal intensity within the acquired magnetic resonance image data and/or reconstructed magnetic resonance images. Similar to an embodiment described above, the displacement of the magnetic resonance visible marker, i.e. when the patient moves a jaw, may be used to adjust an imaging parameter of the magnetic resonance measurement in real-time and/or be used to correct for movement of the patient when performing a reconstruction of magnetic resonance images.

In one embodiment, the magnetic resonance visible markers may be earbuds configured for positioning in an ear of a patient. In this embodiment, the magnetic resonance visible markers may advantageously be combined with headphones, which may be used for communication with the patient. In positioning earbuds with magnetic resonance visible markers in opposite ears of the patient, a motion of the patient's head may favorably be detected in dependence of a tilt of an imaginary axis connecting the earbuds. In a further embodiment, magnetic resonance markers are positioned on a surface of the head of the patient. For this purpose, the magnetic resonance visible markers may be glued or clamped to a surface of the head region of the patient. The glue may provide a temporary attachment, which may become detached after a predetermined period of time and/or be easily detachable by applying water or other solvents.

Magnetic resonance visible markers may be deployed with minimal effort, thus enabling a time-efficient preparation of the magnetic resonance measurement. Due to a high magnetic resonance visibility of said magnetic resonance visible markers, a time efficient and reliable detection of patient motion can be achieved, even when applying low magnetic field strengths.

The inventive magnetic resonance imaging system comprises magnetic resonance imaging device and a processor which is configured to coordinate and execute an inventive method by means of the magnetic resonance imaging device. In order to acquire, process and/or store data, such as magnetic resonance image data, optical image data or motion data, the magnetic resonance imaging system may comprise components such as a controller, a processor, a logic unit, a memory, an internal and/or an external storage unit, as well as a suitable interface configured to transmit and receive data and/or convert data into a desired data format. The processor may comprise a controller, a microcontroller, a CPU, a GPU and the like. The memory and/or the internal storage unit may comprise a RAM, ROM, PROM, EPROM, EEPROM, flash memory, as well as an HDD, an SSD and the like. However, the processor may also have access to an external data storage, i.e. an external server or a cloud storage, connected to the processor via a suitable network connection. The data may be transported between components via analog and/or digital signals using suitable signal connections. The magnetic resonance imaging system may further comprise at least one motion sensor and/or at least one optical sensor configured to determine and/or quantify a movement of a patient positioned in an imaging region of the magnetic resonance imaging device. In an exemplary embodiment, the at least one motion sensor and/or the at least one optical sensor are configured to transmit motion data and/or optical image data to the processor via a suitable signal connection. It is conceivable, that the processor is configured to quantify a movement of the patient in dependence of the motion data and/or the optical image according to an embodiment of the inventive method described above. The processor may further be configured to adjust an imaging parameter of a current magnetic resonance measurement and/or to correct a reconstruction of magnetic resonance image data in dependence of the motion data and/or the optical image data in order to account for a movement of the patient during the magnetic resonance measurement. It is also conceivable, that the processor is configured to acquire a projection image and/or navigator data of the facial region of the patient by means of the magnetic resonance imaging device.

In an exemplary embodiment, the magnetic resonance device is a dedicated scanner configured to acquire magnetic resonance image data of a specific body region of the patient. For example, the magnetic resonance imaging device may be configured to perform a magnetic resonance measurement of an eye region and/or a jaw region of the patient. Thus, an imaging volume of the magnetic resonance imaging device may be tailored to match a diagnostically relevant area, such as an eye, both eyes, a tooth, several teeth, a jaw, a dental arch or both dental arches of the patient. Particularly, the imaging region of the dedicated scanner may be configured to match the specific body region of the patient, such as the facial region of the patient.

In providing a processor configured to correct for a movement of the patient in dependence of motion data and/or optical image data, a quality of magnetic resonance image data acquired from the facial region of the patient can be increased advantageously. Furthermore, in providing a magnetic resonance imaging system including integrated motion sensors and/or optical sensors, a movement of the patient can be determined in a reliable and robust fashion.

The inventive computer program product can be loaded into a memory of a programmable processor of a magnetic resonance imaging system and comprises program code means to perform a method according to the disclosure when the computer program product is executed in the processor of the magnetic resonance imaging system. As a result, the method according to the disclosure can be carried out quickly, and in a robust and repeatable manner. The computer program product is configured in such a way that it can carry out the method steps according to the disclosure by means of the processor. The processor must in each case comprise the prerequisites such as a corresponding main memory, a corresponding graphics card or a corresponding logic unit, so that the respective method steps can be carried out efficiently.

The computer program product is, for example, stored on a computer-readable medium or stored on a network, a server or a cloud, from where it can be loaded into the processor of a local processor. The local processor can be directly connected to the magnetic resonance imaging system or designed as part of the magnetic resonance imaging system. Furthermore, control information of the computer program product can be stored on an electronically readable medium. The control information on the electronically readable medium can be designed in such a way that, when the medium is used, it carries out a method according to the disclosure in a processor of the magnetic resonance imaging system. Examples of an electronically readable medium are a DVD, a magnetic tape or a USB stick on which electronically readable control information, in particular software, is stored. If this control information is read from the medium and stored in a control and/or processor of a magnetic resonance imaging system, all embodiments of the inventive method described above can be carried out.

FIG. 1 shows an embodiment of a magnetic resonance imaging system 11 according to the disclosure. The magnetic resonance imaging system 11 comprises a magnetic resonance (MR) device (MR scanner) 13 with a static field magnet 17 that provides a homogenous, static magnetic field 18 (B0 field). The static magnetic field 18 comprises an isocenter 38 and a cylindrical imaging region 36 for receiving a patient 15. The imaging region 36 is surrounded by the magnet arrangement 30 in a circumferential direction. The patient support 16 is configured to transport the patient 15 into the imaging region 36. In particular, the patient support 16 may transport a diagnostically relevant region of the patient 15 into an imaging volume defined by the isocenter 38 of the magnetic resonance imaging device 13. In an exemplary embodiment, the magnetic resonance device 13 is screened from an environment by a housing shell 60.

The magnetic resonance device 13 further comprises a gradient magnet arrangement 19 configured to provide magnetic gradient fields used for spatial encoding of magnetic resonance signals during the magnetic resonance measurement. The gradient magnet arrangement 19 is activated by a gradient controller 28 via an appropriate current signal.

The magnetic resonance device 13 further comprises a radiofrequency antenna 20 (body coil), which may be integrated into the magnetic resonance device 13. The radiofrequency antenna 20 is operated via a radiofrequency controller 29 that controls the radiofrequency antenna 20 to generate a high frequency magnetic field and emit radiofrequency excitation pulses into an examination space, which is essentially formed by the imaging region 36. The magnetic resonance imaging system 11 may further comprises a local coil 21, which is positioned on or in proximity to the diagnostically relevant region of the patient 15. The local coil 21 may be configured to emit radiofrequency excitation pulses into the patient 15 and/or receive magnetic resonance signals from the patient 15. It is conceivable, that the local coil 21 is controlled via the radiofrequency controller 29.

The magnetic resonance imaging system 11 further comprises a controller 23 configured to control the magnetic resonance imaging system 11. The controller 23 may comprise a processor 24 configured to process magnetic resonance signals and reconstruct magnetic resonance images. The processor 24 may also be configured to process input from a user of the magnetic resonance imaging device 13 and/or provide an output to the user. For this purpose, the processor 24 and/or the controller 23 can be connected to a display unit 25 and an input unit 26 via a suitable signal connection. For a preparation of a magnetic resonance measurement, preparatory information, such as imaging parameters or patient information, can be provided to the user via the display unit 25. The input unit 26 may be configured to receive information and/or imaging parameters from the user. The display unit 25 and the input unit 26 may also be implemented as a combined interface, such as a touch interface. In an exemplary embodiment, the controller 23 includes processor circuitry that is configured to perform one or more functions and/or operations of the controller 23, including controlling the MR imaging system 11 and/or the MR device 13, processing magnetic resonance signals, reconstructing magnetic resonance images, processing input from the user of the magnetic resonance imaging device 13 and/or providing an output to the user.

Of course, the magnetic resonance imaging system 11 may comprise further components that magnetic resonance imaging systems usually have. The general operation of a magnetic resonance imaging system 11 is known to those skilled in the art, so a more detailed description is not deemed necessary.

Figure 2:
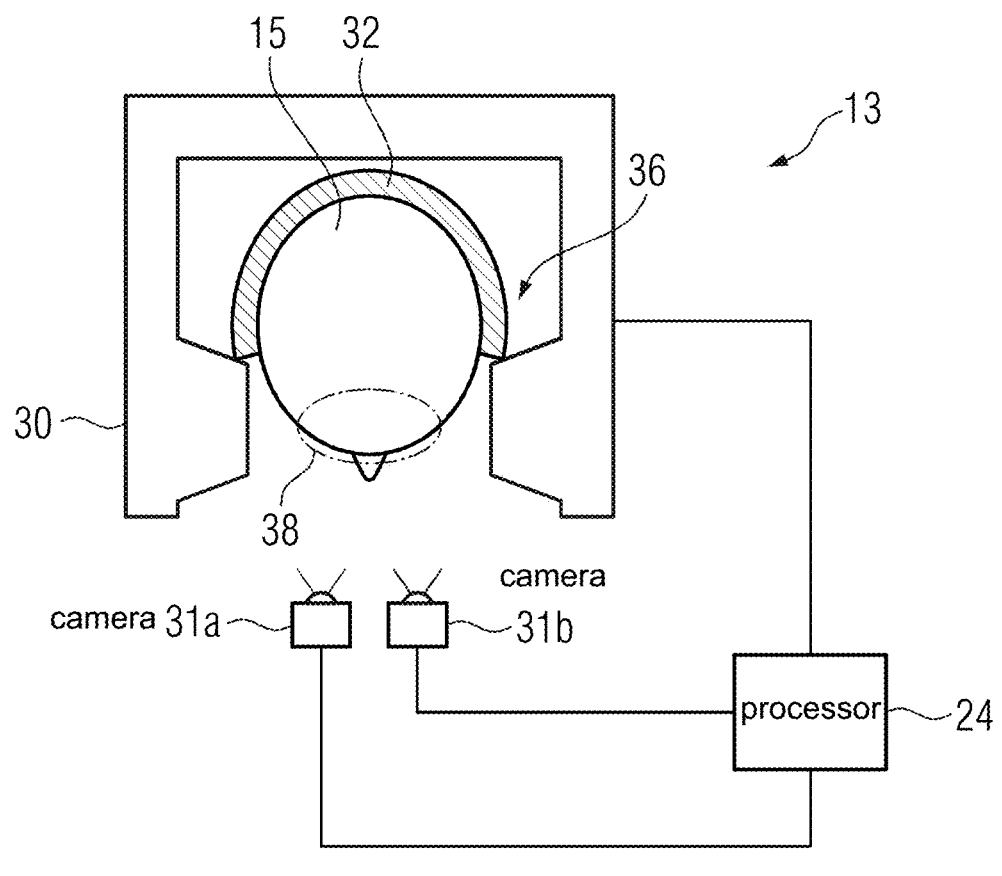
FIG. 2 is a schematic representation of a magnetic resonance imaging system according to an exemplary embodiment of the disclosure.

FIG. 2 depicts a further embodiment of a magnetic resonance imaging device 13 according to the disclosure. The magnetic resonance imaging device 13 comprises a C-shaped magnet arrangement 30 partially encompassing the head of the patient 15 in a circumferential direction. The isocenter 38 provided by the magnet arrangement 30 is positioned in the eye region of the patient 15. It is conceivable, that the magnetic resonance imaging device 13 may be moved relative to the patient 15 along the Z-direction, the Y-direction and/or the X-direction in order to adjust the position of the isocenter 38 to a diagnostically relevant region of the patient 15. It is also conceivable, that the magnetic resonance imaging device 13 may be tilted or turned with respect to the patient 15.

In one example, a diagnostically relevant region may comprise the jaw region of the patient 15. In an exemplary embodiment, the magnet arrangement 30 is configured in such a way, that a shape of the isocenter 38 is matched with a target anatomy of the patient 15. For covering a dental arch of the patient 15, the isocenter 38 may comprise a U-shape or an ellipsoid shape. In other examples, the shape of the isocenter 38 may be ovoid, polygonal, prismatic or any combination thereof. In FIG. 2, the isocenter 38 comprises an ellipsoid shape in order to cover both eyes of the patient 15 during the magnetic resonance measurement. However, the magnetic arrangement 30 may also be configured to provide an approximately spherical isocenter 38 which covers only one eye of the patient 15.

In the depicted embodiment, the magnetic resonance imaging system 11 comprises two cameras 31a and 31b, which are configured to acquire optical image data from the eyes of the patient 15. The cameras 31a and 31b are oriented in such a way, that optical image data of the eyes, particularly of the pupils, can be acquired. The acquired optical image data is transmitted to the processor 24 of the magnetic resonance imaging system 11 via a suitable signal connection. For example, the image data may comprise analog and/or digital signals transferred via a cable connection or a wireless connection such as WLAN, Bluetooth, infrared and so forth. The processor 24 is configured to process the acquired optical image data, as well as magnetic resonance image data and perform a motion correction technique according to one of the embodiments described above. In order to reduce a movement of the patient 15 during the magnetic resonance measurement, the head of the patient 15 is positioned in a headrest 32. The headrest 32 may be configured to suppress tilting and/or turning of the head. For this purpose, the head of the patient 15 may also be fixed in the headrest via suitable fasteners (not shown).

Figure 3:
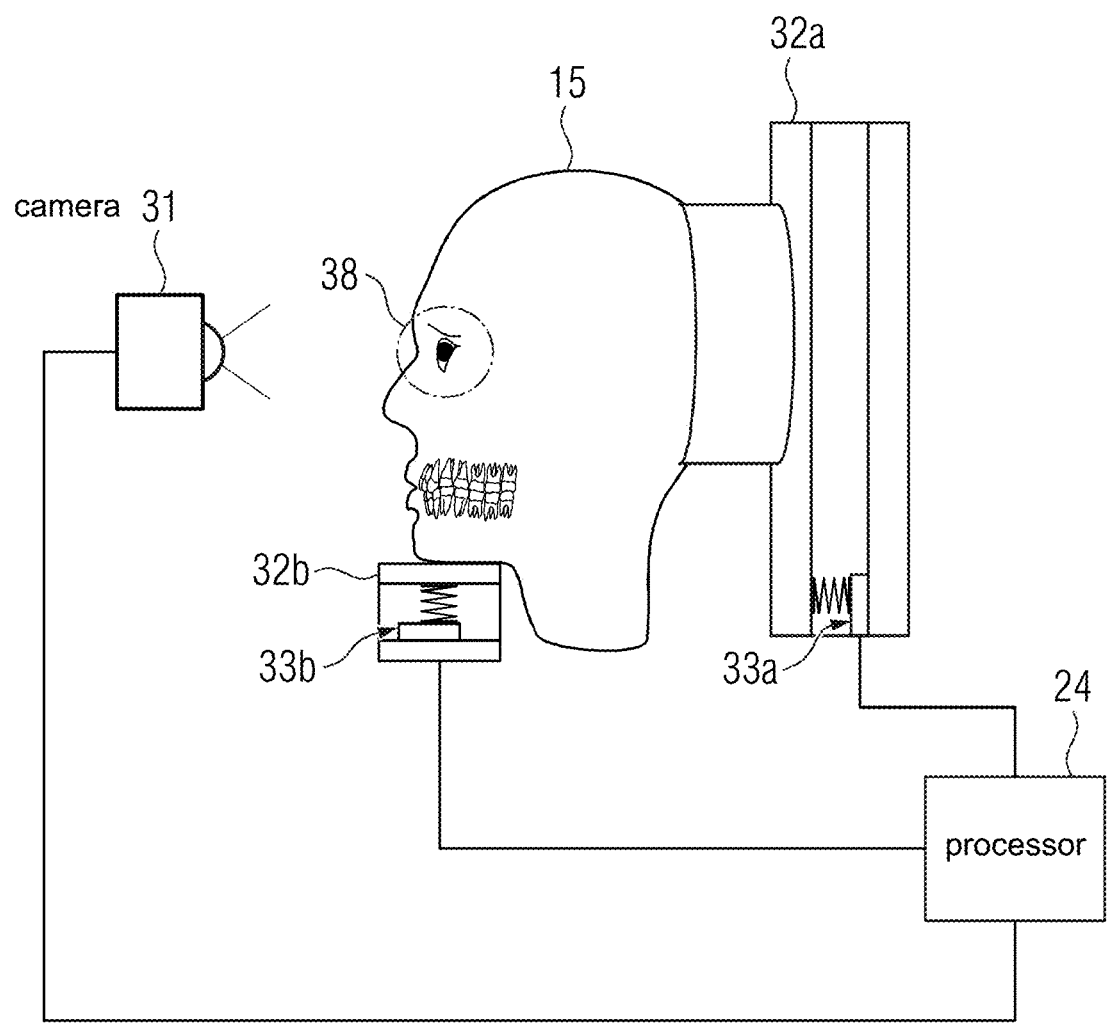
FIG. 3 is a schematic representation of a headrest according to an exemplary embodiment of the disclosure.

FIG. 3 depicts a schematic representation of a headrest 32 according to the disclosure. The headrest 32 comprises a chinrest 32b for resting a chin of the patient 15 and a supporting element 32a for supporting the back of the head of the patient 15. The headrest 32 may be configured to limit movement of the patient 15 during the magnetic resonance measurement. However, in order to increase patient comfort, the headrest 32 may also allow for a predefined degree of motion. For this purpose, the headrest 32 may comprise motion sensors 33a and 33b, which are configured to determine a movement of the head of the patient 15. For example, the motion sensors 33a and 33b may comprise a spring configured to accommodate a motion of the head. A mechanical force exerted on the spring may be determined via the motion sensors 32a and 32b. In one embodiment, the supporting element 32a and the chinrest 32b may comprise strain gauges 33a and 33b embedded in an elastic material, such as a foam or bolster, of the headrest 32. The strain gauges 33a and 33b are configured to transmit a signal representing the mechanical force and/or pressure exerted on the headrest 32 to the processor 24 via a suitable signal connection. The processor 24 may be configured to determine motion data in dependence of the signal provided via the motion sensors 33a and 33b. Of course, the magnetic resonance imaging system 11 may comprise other sensors, such as a camera 31 or further optical and/or motion sensors (not shown), to determine the motion of the patient 15. In the depicted embodiment, the camera 31 may be configured to determine an eye motion of the patient 15. The optical image data acquired via the camera 31 may be transmitted to the processor 24, which may be configured to trigger a magnetic resonance measurement and/or reject acquired magnetic resonance image data in dependence of a position of a pupil of an eye of the patient. As can be seen in FIG. 2 and FIG. 3, an access for a camera 31 and/or a chinrest 32b to the facial region of the patient 15 is provided during the magnetic resonance measurement, which can be exploited by the motion correction technique.

Figure 4:
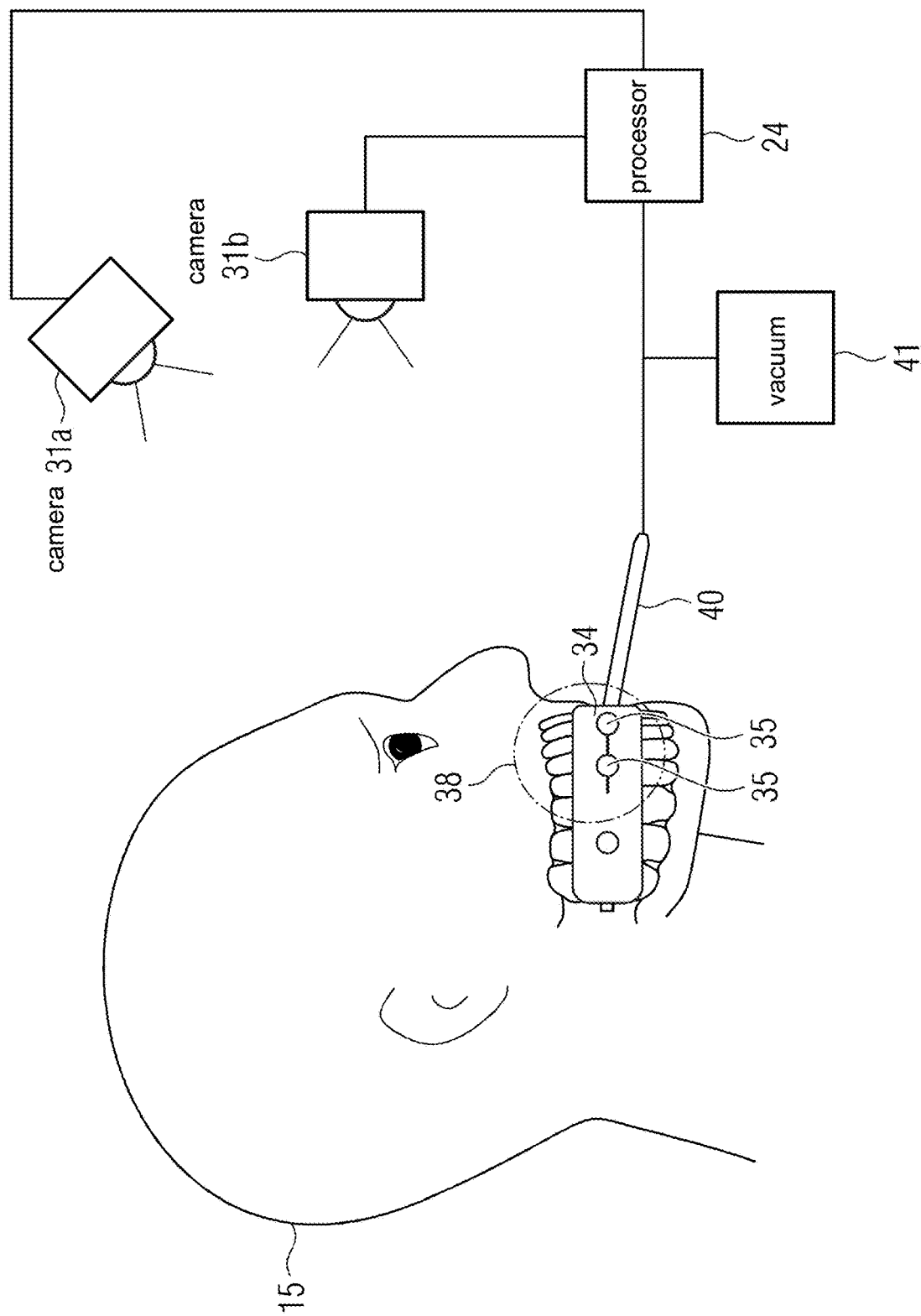
FIG. 4 is a schematic representation of a mouth guard according to an exemplary embodiment of the disclosure.

FIG. 4 holds a schematic representation of a mouth guard 34 according to the disclosure. The mouth guard 34 is positioned inside the oral cavity of the patient 15. In an exemplary embodiment, the mouth guard 34 provides a spacing between the lower dental arch and the upper dental arch of the patient 15 in such a way, that movement of the lower jaw is prevented unless the patient 15 deliberately opens the mouth. Thus, the mouth guard 34 effectively limits the movement in the jaw region of the patient 15. The mouth guard 34 may comprise magnetic resonance visible markers 35, which may be detected by the magnetic resonance imaging device 13. In particular, a motion correction technique according to the disclosure may be used to determine a position of the magnetic resonance visible marker 35 by means of the magnetic resonance image data (k-space data). The motion correction technique may further comprise correcting for motion of the patient 15 in dependence of a position of magnetic resonance visible markers 35 determined from the magnetic resonance image data. It is also conceivable, that the mouth guard 34 comprises a motion sensor 33 (not shown), such as an accelerometer and/or a gyro sensor, configured to determine a movement of the jaw region of the patient 15. The motion sensor 33 may be embedded in the mouth guard 34 or attached to a surface of the mouth guard 34. Signals acquired from the motion sensor 33 may be transmitted to the processor 24 via a wireless or corded signal connection. In the latter case, the signal connection may be carried by or attached to a suction pipe 40 configured to drain saliva from the oral cavity of the patient 15. In the depicted embodiment, the suction pipe 40 is connected to a vacuum system 41 configured to provide a vacuum in the suction pipe 40 in order to drain saliva from the oral cavity of the patient 15.

In order to determine a motion of the patient 15, the magnetic resonance system may further comprise cameras 31a and 31b. The cameras 31a and 31b may be 2D or 3D cameras configured to detect landmarks on the facial region of the patient 15. The optical image data acquired via the cameras 31a and 31b are transmitted to the processor 24, which is configured to determine a motion of the patient 15 in dependence of a position of a landmark in the optical image data. Of course, the number of cameras 31 used for detection of motion may vary.

FIG. 5 depicts a flowchart of an inventive method for reducing motion artifacts in magnetic resonance image data acquired from a facial region of the patient 15.

In a step S1, the patient 15 is positioned in an imaging region 36 of the magnetic resonance imaging device 13 configured to perform a magnetic resonance measurement of the facial region of the patient 15. For this purpose, the patient 15 may be positioned on the patient support 16, which is configured to carry the patient 15 into the imaging region 16 either automatically or in dependence of a control instruction provided by a user of the magnetic resonance imaging device 13. However, as shown in FIG. 2, the magnetic resonance imaging device 13 may also be configured in such a way, that the patient 15 is able to autonomously enter the imaging region 36. It is also conceivable, that the magnet arrangement 30 of the magnetic resonance imaging device 13 is positioned relative to the patient 15 in order to match the isocenter 38 with a diagnostically relevant region. When positioning the patient 15 in the imaging region 36, at least the head of the patient 15 may be supported and/or fixed in a headrest 32, a chin rest 32b or a suitable fastening system in order to reduce a movement of the patient 15 during the magnetic resonance measurement.

In a step S2, a magnetic resonance measurement is performed to acquire magnetic resonance image data of the facial region of the patient 15. Acquiring magnetic resonance image data may comprise performing at least one imaging sequence dedicated to a specific region of the face of the patient 15. In particular, the at least one imaging sequence may be suitable for acquiring magnetic resonance signals of a jaw region, a dental region or an eye region of the patient 15.

In one embodiment, performing the magnetic resonance measurement may comprise acquiring separate magnetic resonance image data from a lower jaw and/or an upper jaw of the teeth region and/or the jaw region of the patient. For this purpose, a plurality of imaging sequences, such as at least two imaging sequences, may be performed. It is conceivable that imaging parameters of the at least two imaging sequences are adjusted to enhance a signal intensity, a signal-to-noise ratio, a resolution and/or an acquisition time of magnetic resonance image data of the lower jaw and/or upper jaw.

In an exemplary embodiment, optical image data and/or motion data is acquired from the patient 15 via at least one optical sensor 31 and/or at least one motion sensor 33 while the magnetic resonance measurement is performed. In one example, the motion sensor 33 may be integrated into a mechanical element, such as a chinrest 32b and/or a supporting element 32a of the magnetic resonance imaging device 13. The optical sensor 31 may be a camera 31 configured to acquire optical image data from the facial region of the patient 15. In an exemplary embodiment, the optical image data and/or motion data is transferred to the processor 24 of the magnetic resonance imaging device 13, which is configured to derive motion data comprising for instance time-related, positional information on the head of the patient and/or the facial region of the patient. In dependence of the motion data, the processor 24 may perform a motion correction technique according to an embodiment described above. It is also conceivable, that a position of a magnetic resonance visible marker 35 is detected via the motion correction technique when performing the magnetic resonance measurement. Thus, the inventive method may comprise several ways or options for determining a motion of the patient 15 during the magnetic resonance measurement.

In one embodiment, a magnetic resonance visible marker 35 is positioned in the facial region of the patient 15. For example, when performing a magnetic resonance measurement of the teeth or jaw region of the patient 15, one or more capsules comprising Vitamin E may be positioned in the oral cavity of the patient 15. The one or more capsules may simply be deposited in the patient's mouth, e.g. in a cheek area and/or below the tongue. In an exemplary embodiment, however, the magnetic resonance visible marker(s) 35 are attached to or embedded in a mouth guard 34, a removable brace or any other carrier element shaped in such a way, that it can be positioned in the oral cavity of the patient 15. In one embodiment, the magnetic resonance visible marker(s) may also be positioned on a surface of the face of the patient 15, e.g. via use of a soluble adhesive and/or clamps. It is also conceivable, that a magnetic resonance visible marker 35 is integrated in an earbud which may be positioned in the patient's ear.

In an optional step S3, a projection image of the facial region of the patient 15 is acquired via the magnetic resonance imaging device 13. A projection image may be derived from a magnetic resonance measurement wherein gradient encoding is not performed in one spatial direction in order to acquire a 2D projection of a 3D imaging volume of at least a part of the facial region of the patient.

In a further optional step S4, a navigator measurement may be performed via the magnetic resonance imaging device in order to acquire navigator data of the facial region of the patient 15. The navigator measurement may comprise an essentially one-dimensional image area, such as oriented approximately perpendicular to an expected moving direction of the patient 15 or a moving part of the facial region of the patient 15.

In a step S5, a motion correction technique exploiting an accessibility to the facial region of the patient during the magnetic resonance measurement is employed, wherein the motion correction technique reduces an influence of a patient motion on the magnetic resonance image data. In one embodiment, the motion correction technique comprises positioning a mouth guard 34 in the intraoral region of the patient 15 in order to suppress movement of the teeth region and/or jaw region. In an exemplary embodiment, the mouth guard 34 is positioned in the oral cavity of the patient 15 before the magnetic resonance measurement is started. Thus, a relative motion of the upper jaw and the lower jaw of the patient 15 may be avoided or reduced while the magnetic resonance measurement is performed. In a further embodiment, the mouth guard 34 comprises a suction pipe 40, wherein the suction pipe 40 is configured to continuously or discontinuously drain saliva from the intraoral region of the patient 15. As a result, the motion correction technique reduces a patient's need for swallowing while the magnetic resonance measurement is performed.

According to one embodiment, the motion correction technique comprises a prospective and/or retrospective correction of the magnetic resonance image data in dependence of a rigid model of the lower jaw and the upper jaw of the patient 15. For deriving the rigid model of the lower jaw and the upper jaw of the patient 15, an initial magnetic resonance measurement may be performed to acquire magnetic resonance image data from the lower jaw and the upper jaw of the patient 15. The rigid model may then be created via segmentation of the magnetic resonance image data or any other image recognition technique. However, it is also conceivable, that the rigid model is derived from an existing model of a lower jaw and/or an upper jaw stored in a storage unit (memory) 27, which may be adapted to the patient 15.

The adaption of the rigid model to the patient 15 may involve using segmented magnetic resonance images acquired from the lower jaw and/or the upper jaw, as well as parameterization of the rigid model in dependence of patient information (e.g. patient data stored in the storage unit 27 and/or patient data entered via the input unit 26). For example, a dimension of the lower jaw and/or the upper jaw derived from a segmented magnetic resonance image may be transferred to a corresponding dimension of the rigid model. The motion correction technique may comprise performing a separate correction of the acquired magnetic resonance image data depending on a time of acquisition and a respective motion state or relative position of the lower jaw and the upper jaw. For this purpose, the individual k-space-lines may be transferred to an image space before correction. Based on the rigid model, a translational motion of the lower jaw and/or the upper jaw may be corrected by applying a phase change to the acquired magnetic resonance image data. In order to compensate for rotational movement of the head of the patient 15, non-Cartesian reconstruction methods may be applied.

In a further embodiment, the motion correction technique comprises positioning a mechanical element 32b in contact with the facial region of the patient 15, wherein the mechanical element 32b comprises a motion sensor 33b, wherein the motion correction technique comprises determining a displacement of the mechanical element 32b due to motion of the patient 15 while performing the magnetic resonance measurement. Due to movement of the patient 15, the position of the diagnostically relevant region may vary within the imaging region 36. The movement of the patient 15 may cause a translative movement of the mechanical element 32b detected via motion sensor 33, thus displacing the mechanical element 32b. The motion correction technique further comprises a prospective and/or retrospective correction of the magnetic resonance image data in dependence of the displacement of the mechanical element 32b. In order to compensate for the translative movement, the frequency and/or phase of the radiofrequency excitation pulse emitted via the radiofrequency antenna 20 is adjusted in real-time in such a way, that the imaging volume tracks the diagnostically relevant region of the patient 15 during the magnetic resonance measurement. In a similar fashion, one or more motion sensors 33 may also detect a rotational movement of the patient's head. In this case, an encoding gradient of the imaging sequence may be rotated in order to account for the detected movement.

In one embodiment, the motion correction technique comprises employing an optical sensor to acquire optical image data of the facial region of the patient while performing the magnetic resonance measurement and a prospective and/or retrospective correction of the magnetic resonance image data in dependence of the optical image data. As described above, the processor 24 may be configured to derive motion data of the patient 15 in dependence of optical image data acquired via a camera 31 (see FIGS. 2 to 4). The motion data may be used to adjust a field of view, a slice center and/or an excitation pulse frequency for a next acquired k-space line in real-time during the magnetic resonance measurement. For example, encoding gradients of the imaging sequence may be rotated in accordance with a rotational movement of the patient's head, whereas a translational movement may be accounted for by changing a frequency of the radiofrequency excitation pulse. However, the motion data may also be fed back to an image reconstruction algorithm in order to correct the magnetic resonance image data for motion of the patient retrospectively.

As described above, this may comprise applying a phase change to the acquired magnetic resonance image data in order to compensate for translational motion and/or applying non-Cartesian reconstruction methods for correcting rotational motion. In particular, the prospective and/or retrospective correction of the magnetic resonance image data may be carried out in dependence of a detected motion of a pupil of an eye of the patient 15.

In one embodiment, the motion correction technique comprises adjusting a projection direction in dependence of a detected motion of the facial region of the patient 15. For example, a projection image may comprise a front view or a side view of a dental arch of the patient 15. The projection direction may be adjusted in real-time in dependence of motion data derived from a signal of an optical sensor 31 and/or a motion sensor 33. In particular, the projection direction may be adjusted in accordance with a turning and/or tilting motion of the head in order to maintain an initial projection trajectory with respect to the patient's head. This adjustment may be performed according to one of the embodiments described above.

According to one embodiment, the motion correction technique comprises detecting a displacement of a characteristic feature in the navigator data and prospectively and/or retrospectively correcting of the magnetic resonance image data in dependence of the displacement of the characteristic feature. In an exemplary embodiment, the navigator measurement comprises an essentially one-dimensional image area. The image area may be positioned in such a way, that it covers a region with high T2(*) variations, e.g. a border of a tooth of the patient 15, wherein the characteristic feature may be represented by a border of a tooth of the patient 15. A movement of the patient 15 may be determined based on a shift or relocation of the characteristic feature within the image area of the navigator data. An adjustment of an imaging parameter of the magnetic resonance measurement and/or a correction of the magnetic resonance image data may be performed in dependence of the displacement of the characteristic feature according to any of the embodiments described above. For example, the frequency and phase of the radiofrequency excitation pulse is changed in accordance a movement displacement of the characteristic feature in the image area of the navigator measurement in order to prospectively correct for translational movement of the patient 15.

In a further embodiment, the motion correction technique comprises a prospective and/or retrospective correction of the magnetic resonance image data in dependence of a displacement of a magnetic resonance visible marker 35 due to motion of the patient 15. In an exemplary embodiment, a magnetic resonance visible marker 35 provides a high signal intensity which may provide a characteristic contrast of pictures elements (pixels) in a reconstructed magnetic resonance image. A displacement of such a characteristic contrast between a plurality of magnetic resonance images may be used to quantify a motion of the patient 15 and correct for the detected motion as described above.

The embodiments described above are to be recognized as examples. Individual embodiments may be extended by features of other embodiments. In particular, a sequence of the steps of the inventive methods are to be understood as exemplary. The individual steps can also be carried out in a different order or overlap partially or completely in time.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A method for reducing motion artifacts in magnetic resonance image data acquired from a facial region of a patient, the method comprising:

positioning the patient in an imaging region of a magnetic resonance imaging (MRI) device configured to perform a magnetic resonance (MR) measurement of the facial region of the patient;

positioning a mechanical element in contact with the facial region of the patient to establish contact with the patient's chin, the mechanical element including a motion sensor configured to detect motion of the patient's chin;

performing the MR measurement to acquire MR image data of the facial region of the patient;

determining a displacement of the mechanical element due to motion of the patient while performing the MR measurement; and performing a motion correction, exploiting an accessibility to the facial region of the patient during the MR measurement, to reduce an influence of a patient motion on the MR image data, wherein the motion correction includes a prospective and/or retrospective correction of the MR image data based on the displacement of the mechanical element.

2. The method according to claim 1, further comprising another mechanical element that comprises a head rest configured to engage and limit movement of the patient's head, wherein the motion correction is further based on a displacement of the other mechanical element.

3. The method according to claim 1, wherein the mechanical element comprises a chin rest configured to engage and limit movement of the patient's chin.

4. The method according to claim 1, wherein:

the facial region comprises a teeth region and/or jaw region of the patient; and the motion correction comprises positioning a mouth guard in an intraoral region of the patient to suppress movement of the teeth region and/or the jaw region of the patient while performing the MR measurement.

5. The method according to claim 4, wherein:
the mouth guard comprises a suction pipe; and
the motion correction comprises draining saliva from the intraoral region of the patient via the suction pipe while performing the MR measurement to reduce a need for swallowing.

6. The method according to claim 1, wherein the motion correction comprises acquiring optical image data of the facial region of the patient using an optical sensor while performing the MR measurement, wherein the prospective and/or retrospective correction of the MR image data is further based on the optical image data.

7. The method according to claim 6, wherein the facial region of the patient comprises an eye region of the patient and wherein the optical image data is acquired from the eye of the patient.

8. The method according to claim 7, wherein the prospective and/or retrospective correction of the MR image data is further based on a detected motion of a pupil of the eye of the patient.

9. The method according to claim 1, wherein:
the MR measurement comprises acquiring separate MR image data from a lower jaw and an upper jaw of the teeth region and/or jaw region; and
the motion correction further comprises an additional prospective and/or retrospective correction of the separate MR image data based on a rigid model of the lower jaw and the upper jaw of the patient.

10. The method according to claim 1, further comprising:
acquiring a projection image of the facial region of the patient, the motion correction including adjusting a projection direction based on a detected motion of the facial region of the patient.

11. The method according to claim 10, further comprising:
performing a navigator measurement of the facial region of the patient to acquire navigator data, the motion correction including detecting a displacement of a characteristic feature in the navigator data and prospectively and/or retrospectively correcting the MR image data based on the displacement of the characteristic feature.

12. The method according to claim 1, further comprising:
performing a navigator measurement of the facial region of the patient to acquire navigator data, the motion correction including detecting a displacement of a characteristic feature in the navigator data and prospectively and/or retrospectively correcting the MR image data based on the displacement of the characteristic feature.

13. A magnetic resonance imaging (MRI) system, comprising:
a magnetic resonance (MR) scanner configured to perform a magnetic resonance (MR) measurement of a facial region of a patient, the MR scanner including a mechanical element configured to contact the facial region of the patient to establish contact with the patient's chin; and
a controller that is configured to:
control the MR scanner to perform the MR measurement to acquire MR image data of the facial region of the patient positioned in an imaging region of the MR scanner;
determine, based on a displacement of the mechanical element during the MR measurement, a motion of the patient's chin; and
perform motion correction, exploiting an accessibility to the facial region of the patient during the MR measurement, to reduce an influence of a patient motion on the MR image data, wherein the motion correction includes a prospective and/or retrospective correction of the MR image data based on the determined motion of the patient.

14. The MRI system according to claim 13, further comprising another mechanical element that comprises a head rest configured to support the patient's head, wherein the motion correction is further based on a displacement of the other mechanical element.

15. The MRI system according to claim 13, wherein the mechanical element comprises a chin rest configured to support the patient's chin.

16. The MRI system according to claim 13, wherein the facial region comprises the patient's chin or head.

17. The MRI system according to claim 13, wherein the mechanical element is a head rest comprising a support configured to support the patient's head and a chin rest configured to support the patient's chin, the support including a first motion sensor configured to detect a first motion of the patient and the chin rest including a second motion sensor configured to detect a second motion of the patient, wherein the displacement is determined based on the first motion and/or the second motion.

18. A method for reducing motion artifacts in magnetic resonance image data acquired from a facial region of a patient, the method comprising:
positioning the patient in an imaging region of a magnetic resonance imaging (MRI) device configured to perform a magnetic resonance (MR) measurement of the facial region of the patient;
positioning a mechanical element in contact with the facial region of the patient to establish contact with the patient's chin, the mechanical element including a motion sensor, the mechanical element configured to engage and suppress movement of the facial region of the patient;
performing the MR measurement to acquire MR image data of the facial region of the patient;
determining a displacement of the mechanical element due to motion of the patient while performing the MR measurement; and
performing a motion correction, exploiting an accessibility to the facial region of the patient during the MR measurement, to reduce an influence of a patient motion on the MR image data, wherein the motion correction includes a prospective and/or retrospective correction of the MR image data based on the displacement of the mechanical element.

* * * * *